June 22, 1948.  H. G. MUELLER  2,443,692
STEAM ENGINE VALVE CRANKSHAFT BEARING SUPPORT
Original Filed June 8, 1943  3 Sheets-Sheet 3

Inventor
H.G.Mueller
By Kimmel & Crowell
Attys.

Patented June 22, 1948

2,443,692

UNITED STATES PATENT OFFICE 2,443,692

STEAM-ENGINE VALVE CRANKSHAFT BEARING SUPPORT

Herman Gundert Mueller, Erie, Pa., assignor to Ajax Iron Works, Cory, Pa.

Original application June 8, 1943, Serial No. 490,071. Divided and this application August 2, 1944, Serial No. 547,782

1 Claim. (Cl. 121—194)

This invention relates to steam engines and is a division of my copending application S. N. 490,071, filed June 8, 1943, for Valve gear for steam engines, and now abandoned.

An object of this invention is to provide an improved bearing assembly for a valve gear crankshaft which will facilitate the mounting and aligning of the bearings.

Another object of this invention is to provide in combination with the upper portion of a crankshaft casing an improved bearing support which will reduce the amount and character of machine work necessary to provide for alignment of the valve gear crankshaft.

A further object of this invention is to provide a crankshaft bearing support which is constructed in the form of an open boxing having an upper supporting flange whereby the boxing may be dependingly supported within the valve gear crankshaft, the lower side of the boxing having one or more flat surfaces parallel with the lower machined side of the upper flange so that the bearings may be secured to the lower machined sides and all bearings will be in alignment.

With the foregoing objects and other which may hereinafter appear, the invention consists of the novel construction, combination and arrangement of parts as will be more specifically referred to and illustrated in the accompanying drawings, wherein are shown embodiments of the invention, but it is to be understood that changes, variations, and modifications may be resorted to which fall within the scope of the invention as claimed.

Figure 3:
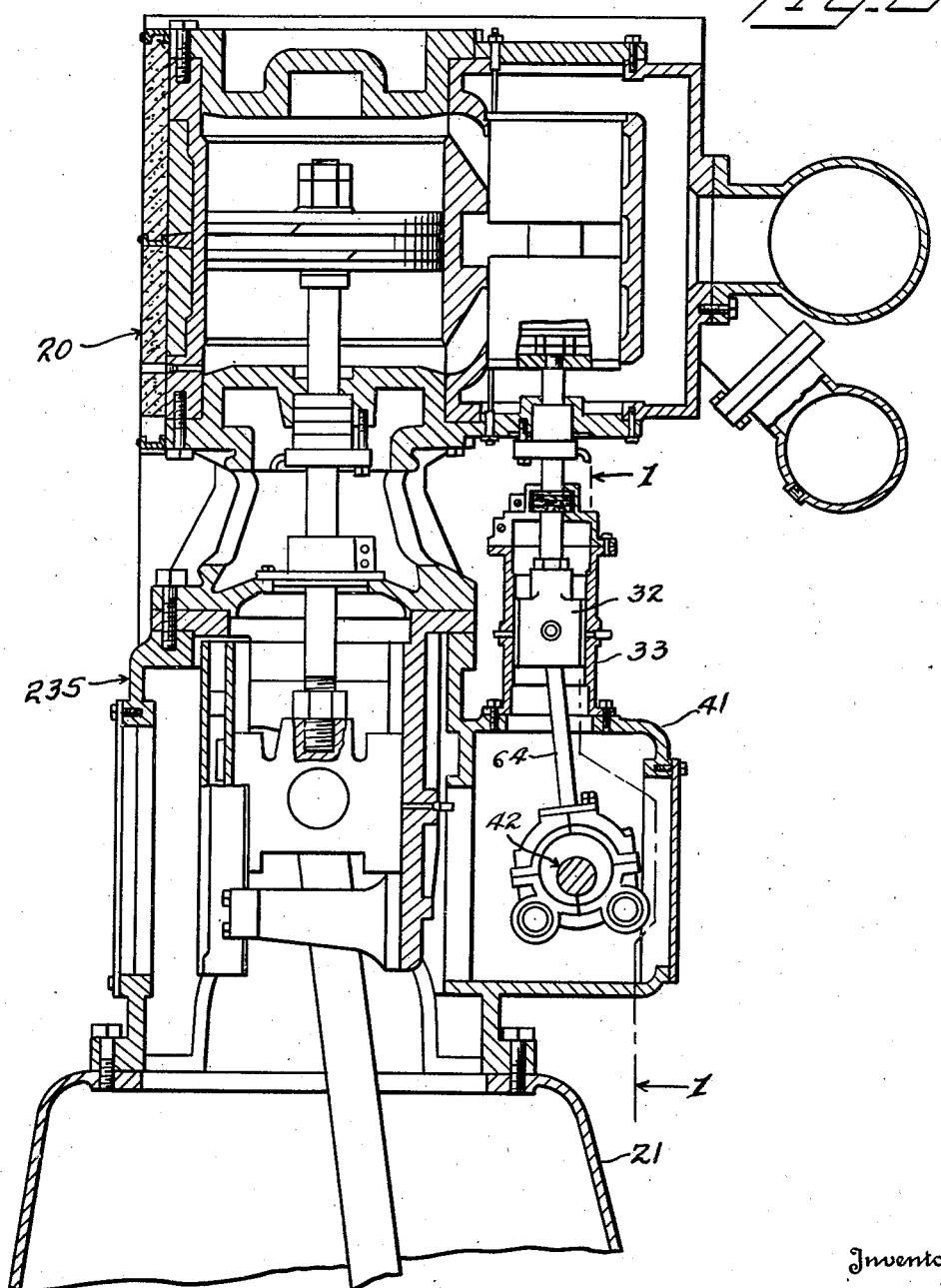
Figure 3 is a vertical sectional view of a steam engine constructed according to an embodiment of this invention.

Referring to the drawings, and first to Figure 3, the numeral 20 designates generally a cylinder which is supported above a crankcase 21 by means of an intermediate support 235. The intermediate support 235 has secured to one side thereof a valve gear housing 41 within which an endwise adjustable valve gear crankshaft 42 is rotatably mounted. The crankshaft 42 is connected to a vertically slidable crosshead 32 which is slidable in a guide 33 by means of a pitman 64. It will be understood that there may be as many cylinders 20 as may be desired.

The crankshaft 42 is journalled in bearings 43 which are secured in pairs to bearing supporting members, generally designated as 251, which are removable with respect to the crankcase housing 41. The bearing supporting members 251 are constructed in the form of upwardly opening boxes or housings which are provided at their upper ends with flanges 252 overlapping the upper side 253 of the housing 41, and secured thereto by fastening bolts 254. In this manner, the upper side 253 of the housing 41 may be planed off and the lower side of the flange 252 together with the lower side of the lower wall 255 of the housing 251 may be planed off to provide for the desired distance between the upper surface 253 and the lower surface of the lower wall 255. This will permit the proper alignment of the bearings 43 within the housing 41 without planing or milling the bearing surfaces inside the housing 41.

Figure 1:
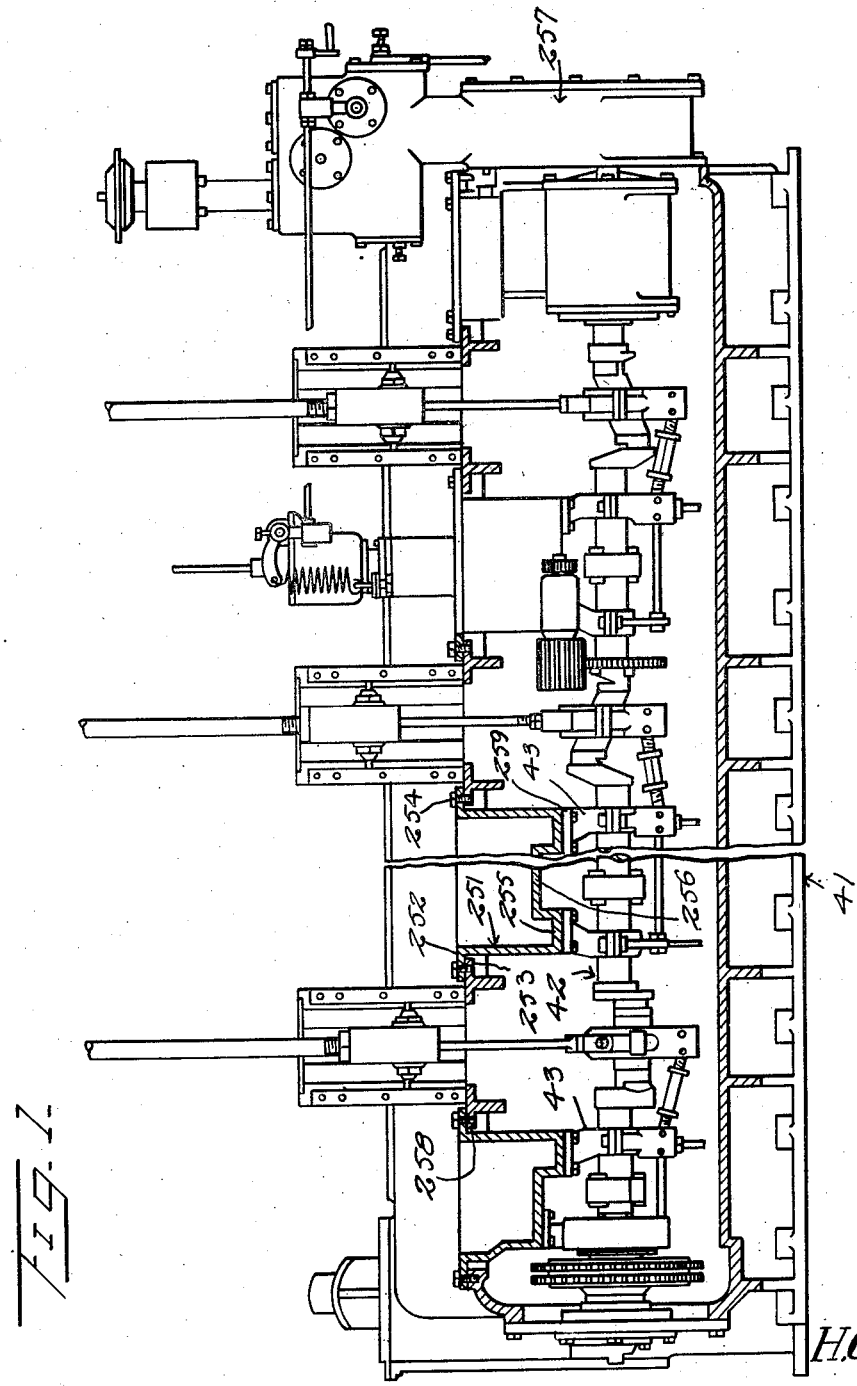
Figure 1 is a longitudinal section, partly broken away taken substantially on the line 1—1 of Figure 3, of a bearing supporting structure, constructed according to an embodiment of this invention with the cylinders and main or lower crankcase removed.
Figure 2:
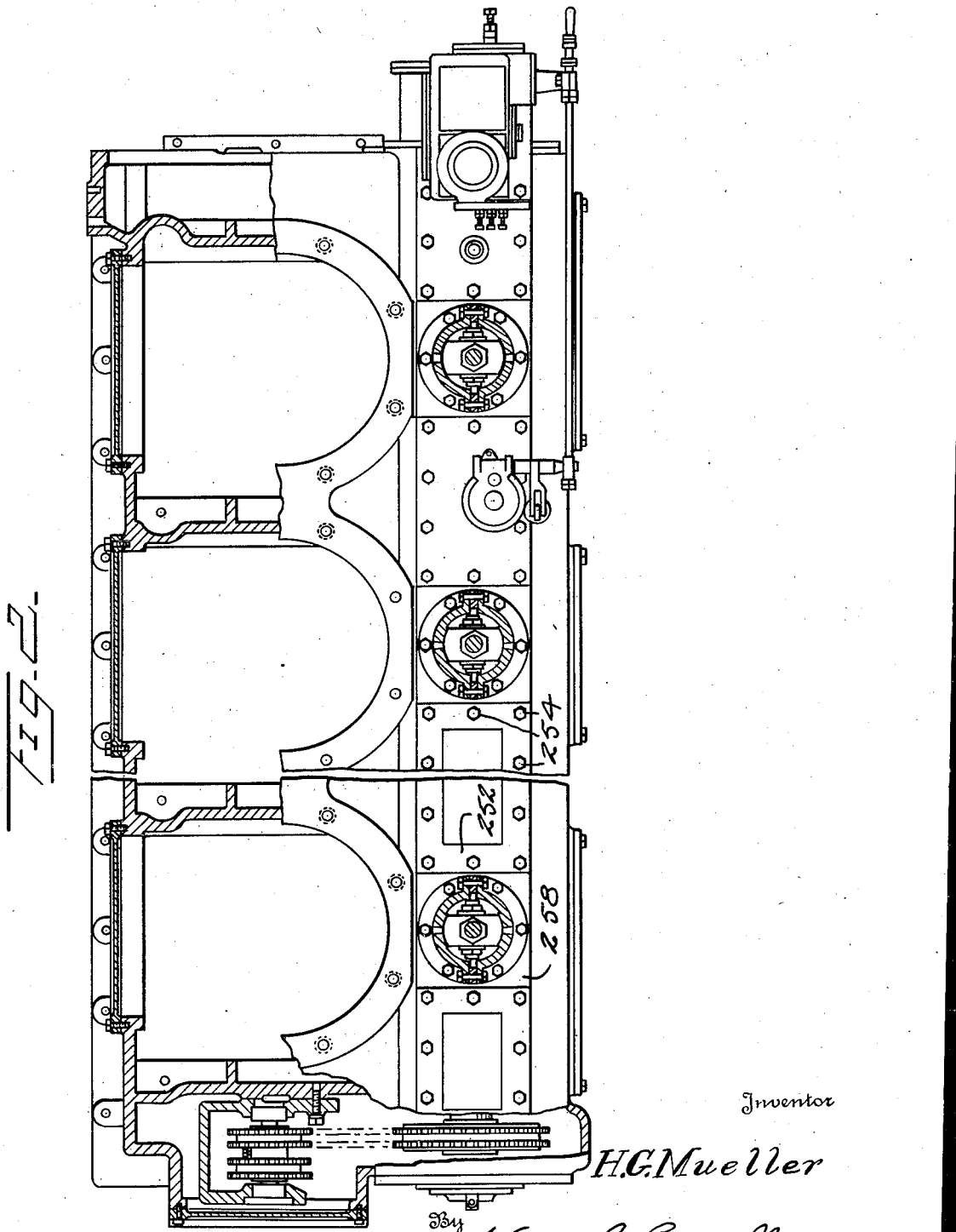
Figure 2 is a detailed top plan, partly broken away, and in section, of the bearing support.

As shown in Figure 1, the housings 251 are provided with an upwardly offset intermediate wall 256 which is between the lower pair of walls 255 so as to provide a minimum surface for planing. The housings or bearing supporting members 251 are inserted into the crankcase from above, the flanges 252 seating on the planed surfaces of the upper side 253 of the crankcase 41 and in the event any adjustment is necessary to properly align the bearings 43, this adjustment may be obtained by interposing shims between the bearings 43 and the lower walls 255 or one or more shims between the flange 252 and the upper side 253 of the crankcase 41.

The crank supporting structure hereinbefore described has been designed as a fairly heavy duty supporting structure so as to rigidly support the crankshaft 42, the latter being endwise movable as well as rotatable, as set forth in my copending application supra. The crankshaft 42 is adapted to be shifted endwise by means of a hydraulic operator, generally designated as 257, the details of which are more specifically set forth in my copending application.

In the mounting of the bearing supporting housings 251, the lower side of the flange 252 may be planed off to provide a flat surface on the lower side and the outer or lower side of the wall 255 may also be planed flat. The upper side of the wall 253 of the crankcase 41 may be planed flat and the housings 251 may then be inserted in the openings provided therefor and designated by the numeral 258. The housings are secured in position by means of fastening bolts 254, and the bearings 43 are bolted by fastening members 259 to the lower side of the lower walls 255. Inasmuch as the upper surface of the upper wall 253 is planed flat, it is not difficult to plane the surface of the flanges 252 and the walls 255 so that the planed surfaces will be the desired distance apart for positioning the bearings 43 in accurate alignment. This manner of machining the crankcase and the bearing supporting members eliminates milling or other intricate machine operations, and provides for the production of the engine with which the bearing supports are combined at a considerably reduced cost.

These bearing supporting members have been placed in actual operation on large steam engines and have provided a means for speeding up the production of such engines in addition to lowering the costs thereof.

What is claimed is:

In a steam engine, an intermediate member adapted to be disposed between the cylinders and the crankcase, a valve gear housing carried by one side of said member, said housing having a top wall formed with openings, and the upper surface of said top wall being machined flat, a valve gear shaft extending lengthwise within said housing, spaced bearings for said shaft, and means dependingly carried by said housing and extending downwardly through said openings for supporting said bearings, said means comprising a box-shaped member open at the top thereof, outwardly extending flanges carried by the upper end of said latter named member and having lower surfaces engageable on said upper surface of said top wall, a bottom wall carried by said member having the lower surface thereof parallel with the lower surfaces of said flanges, said bearings being secured to and depending from said bottom wall.

HERMAN GUNDERT MUELLER.

REFERENCES CITED

The following references are of record in the file of this patent:

UNITED STATES PATENTS

| Number | Name | Date |
|---|---|---|
| 727,752 | Crompton | May 12, 1903 |
| 864,049 | Turner | Aug. 20, 1907 |
| 1,334,010 | Badger | Mar. 16, 1920 |
| 1,622,687 | Szekely | Mar. 29, 1927 |
| 1,677,375 | Tapley | July 17, 1928 |
| 2,081,543 | Köhler | May 25, 1937 |
| 2,295,962 | Mueller | Sept. 15, 1942 |